United States Patent
Wang

(10) Patent No.: US 9,652,566 B2
(45) Date of Patent: May 16, 2017

(54) METHODS FOR SIMULATING OXIDES IN ALUMINUM CASTINGS

(71) Applicant: GM Global Technology Operations LLC, Detroit, MI (US)

(72) Inventor: Qigui Wang, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 947 days.

(21) Appl. No.: 13/965,584

(22) Filed: Aug. 13, 2013

(65) Prior Publication Data
US 2015/0051879 A1    Feb. 19, 2015

(51) Int. Cl.
*G06F 7/60* (2006.01)
*G06F 17/50* (2006.01)
*G01M 5/00* (2006.01)

(52) U.S. Cl.
CPC ....... *G06F 17/5009* (2013.01); *G01M 5/0033* (2013.01); *G06F 2217/16* (2013.01); *G06F 2217/41* (2013.01)

(58) Field of Classification Search
CPC ............. G06F 2217/41; G06F 2217/16; G06F 17/5009; G01M 5/0033
USPC ................................................... 703/2, 1, 6
See application file for complete search history.

(56) References Cited

U.S. PATENT DOCUMENTS

| | | | | |
|---|---|---|---|---|
| 8,355,894 B2 * | 1/2013 | Wang | ............... | G06F 17/5018 164/4.1 |
| 8,655,476 B2 * | 2/2014 | Wang | ............... | G06F 17/5018 164/4.1 |
| 2003/0205475 A1 * | 11/2003 | Sawitowski | ............ | B22C 9/061 205/70 |
| 2010/0235110 A1 * | 9/2010 | Wang | ............... | G06F 17/5009 702/35 |
| 2012/0232685 A1 | 9/2012 | Wang et al. | | |

OTHER PUBLICATIONS

Feng Liu, Optimized Design of Gating/Riser System in Casting Based on CAD and Simulation Technology, 2008, Diss. Worcester Polytechnic Institute, pp. 1-59.*
Li et al., "Numerical studies of the motion of particles in current-carrying liquid metals flowing in a circular pipe", 2000, Metallurgical and Materials Transactions B 31.2, pp. 357-364.*
Li et al., "Numerical studies of the motion of spheroidal particles flowing with liquid metals through an electric sensing zone", 2000, Metallurgical and Materials Transactions B 31.4, pp. 855-866.*

(Continued)

*Primary Examiner* — Kamini S Shah
*Assistant Examiner* — Juan Ochoa

(57) ABSTRACT

A method of simulating aluminum oxides defects in aluminum castings comprises determining the free surface area for a plurality of particles of aluminum in an aluminum melt, storing the free surface area for each particle of aluminum, tracking the free surface area change during mold filling, and calculating the total area of entrained or surface oxide films based on the free surface area change during mold filling. The method may further comprise a scalar variable method and a discrete particle method coupled together to simulate the aluminum oxide defects in aluminum castings.

6 Claims, 5 Drawing Sheets

(56) References Cited

OTHER PUBLICATIONS

Manoj Kumar Parmar, Unsteady Forces on a Particle in Compressible Flows, 2010, Dissertation University of Florida, pp. 1-207.*

Wang, et al., Oxide Films, Pores and the Fatigue Lives of Cast Aluminum Alloys, Metallurgical and Materials Transactions B, vol. 37B, Dec. 2006, pp. 887-985, USA.

Campbell, Castings Second Edition, Elsevier Butterworth-Heinemann, 2003, Chapter 2, pp. 1-3 and pp. 17-31, Great Britain.

* cited by examiner

METHODS FOR SIMULATING OXIDES IN ALUMINUM CASTINGS

FIELD OF THE INVENTION

The present invention relates to predictions of aluminum oxides in aluminum castings and, more particularly, to methodologies and techniques to simulate and predict the size and volume fraction of aluminum young oxides formed during mold filling processes.

BACKGROUND OF THE INVENTION

Oxide films form on aluminum alloys when they are exposed to an atmosphere containing oxygen. Specifically, aluminum readily oxidizes in the presence of air (Eqn. (1)), or moisture (Eqns. (2 and 3)), rapidly forming a thin, strong protective oxide film on any exposed aluminum metal surface, including both liquid and solid surfaces.

$$4Al + 3O_2 \rightarrow 2Al_2O_3 \quad (1)$$

$$3H_2O + 2Al \rightarrow Al_2O_3 + 3H_2 \quad (2)$$

$$H_2 \rightarrow 2[\underline{H}]_{melt} \quad (3)$$

Because aluminum oxide is very stable thermodynamically, it is typically present in all aluminum alloys. Therefore, any furnace charge contains unavoidable amounts of alumina as a typical coating, constituting an exogenous inclusion source. During the mold filling of the casting process, additional aluminum oxides are formed when the free surface of the melt front contacts air and particularly when the liquid melt velocity produces turbulent flow. A distinction is often made between oxides pre-existing in the melting furnace, referred to as "old oxides," and those created during mold filling, called "young oxides." Campbell, J., *Castings*, Elsevier Butterworth-Heinemann, 2003; Q. G. Wang, C. J. Davidson, J. R. Griffiths, and P. N. Crepeau, "Oxide Films, Pores and The Fatigue Lives of Cast Aluminum Alloys", Metall. Mater. Trans. vol. 37B (2006), pp. 887-895. For young oxides, the cause of entrainment has been described as "surface turbulence," a reference to phenomena such as two or more flow fronts joining together (bifilms, flow marks, folds, and cold shuts), a contraction of the surface area of a liquid (with folding of the oxide surface), or the passage of a bubble through the liquid.

Young oxides are more detrimental to material properties than old oxides. Because of the lack of wetting between oxide films folded dry side to dry side in young oxides, the entrained oxide unfurls during solidification and acts like a void or crack in the solidifying aluminum casting. These cracks can not only be initial sites for pore formation, but also be frozen into the solid and can significantly decrease the tensile and fatigue strengths of the casting. The bi-films can also cause hot tearing. Entrained oxides are believed to increase melt viscosity, and hence reduce fluidity, and adversely affect the feeding of castings. Surface oxide skins can significantly increase the apparent surface tension of melts and increase the possibilities of forming cold shuts, flow marks, and misruns.

In many cases, such as high pressure die casting, turbulent flow of the aluminum melt readily occurs. The problem of entrapped young oxides can arise if the velocity of the liquid metal is sufficiently high at some point in the flow to fall back under gravity and entrap a portion of its own surface. This critical velocity is believed between 0.45 m/s and 0.5 m/s for Al, Mg, Ti, and Fe alloys. Campbell, J., *Castings*, Elsevier Butterworth-Heinemann, 2003. It is desirable to remain under this critical velocity to significantly reduce the number of oxides in the casting. However, in gravity casting processes, velocities can easily exceed 0.5 m/s in the pour cup or the downsprue. Oxides consequently form even before metal enters the casting or runner system. These oxides can be carried into the casting and have the same detrimental effect as oxides formed in the runners or the casting cavity. Low pressure casting processes offer improved control over fill speeds so oxide formation is therefore generally reduced. However, velocities in the sprue can still exceed 0.5 m/s resulting in formation of entrained oxides.

To minimize and eventually eliminate the oxides in the final cast aluminum products, it is desired to predict oxide defects in cast aluminum components to be able to develop an optimized gating/riser system, filtration, and fill profile.

Although there is a strong practical need to simulate and predict the size and volume of aluminum young oxides formed during a mold filling process, no reliable method or technique has yet been reported.

BRIEF SUMMARY OF THE INVENTION

In view of the above and other problems, features of the present invention are included in the present disclosure that enable prediction and simulation of oxide formation during mold filling processes.

In accordance with one embodiment of the present invention, there is provided a method of simulating aluminum oxides defects in aluminum castings comprising determining the free surface area for a plurality of particles of aluminum in an aluminum melt, storing the free surface area for each particle of aluminum, tracking the free surface area change during mold filling, and calculating the total area of entrained or surface oxide films based on the free surface area change during mold filling.

In accordance with another embodiment of the present invention, there is provided a method of simulating aluminum oxide defect distribution in aluminum castings comprising tracking the motion of entrained aluminum oxide particles by taking into account buoyancy force of entrained aluminum oxide particles in liquid aluminum, drag force of entrained oxide particles moving through liquid aluminum, Basset force, and added mass from the acceleration or deceleration of entrained aluminum oxide particles through liquid aluminum.

In accordance with another embodiment of the present invention, there is provided a method of simulating aluminum oxides defects in aluminum castings comprising determining the free surface area for each particle of aluminum in an aluminum melt, storing the free surface area for each particle of aluminum, tracking the free surface area change during mold filling, calculating the total area of entrained or surface oxide films based on the free surface area change during mold filling, determining the total area of bifilms created, determining the total area of flow marks created, and determining the total area of cold shuts created. The total area of bifilms are calculated by storing the area of contact between fluid fronts meeting at angles of more than 135 degrees for each particle and summing over all particle areas. The total area of flow marks are calculated by storing the area of bifilms created at temperatures below liquidus. The total area of cold shuts is calculated by storing the area of bifilms created at temperatures below the median temperature of the freezing range.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Predicting the occurrence of oxides and associated defects prior to establishing a manufacturing process offers significant value. Design and manufacturing alternatives can be explored and optimized prior to production and implementation of physical manufacturing systems. This preproduction design and optimization is believed to result in improved reliability in the product of a metal casting process. Modeling the formation and dispersion of oxides and associated defects using numerical analysis of the proposed system helps alleviate this problem.

Figure 5:
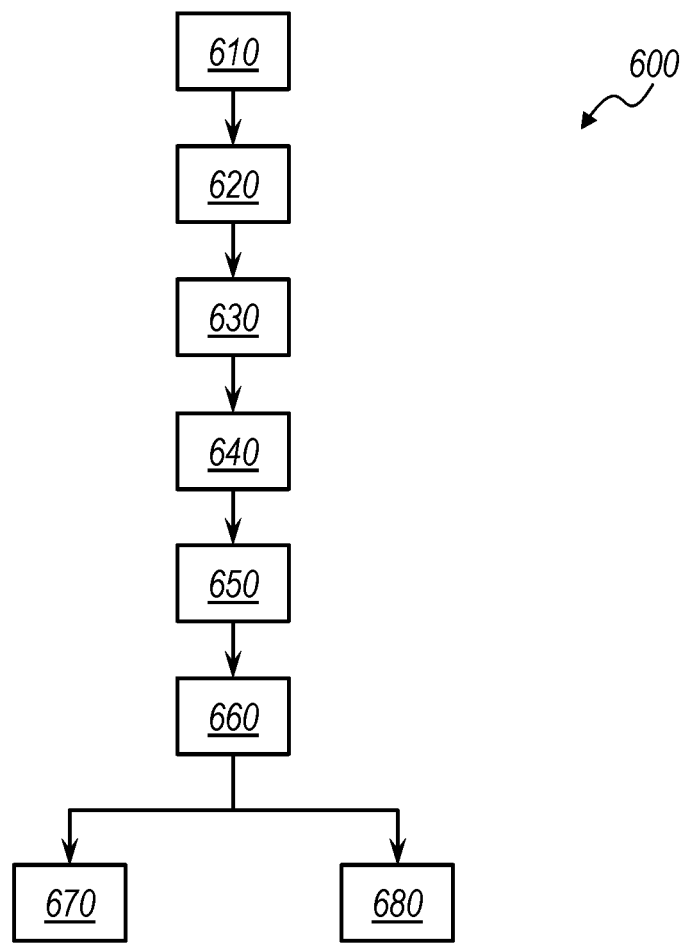
FIG. 5 shows a flowchart of a method of simulating aluminum oxides defects in aluminum castings.

FIG. 5 shows a method of simulating aluminum oxides defects in aluminum castings 600 comprising: step 610—providing a mold and a mold filling approach for casting an aluminum melt; step 620—determining the free surface area for a plurality of particles of aluminum in the aluminum melt; step 630—storing the free surface area for each particle of aluminum; step 640—tracking the free surface area change during filling of the casting mold; step 650—calculating the total area of entrained or surface oxide films based on the free surface area changed during filling of the mold in accordance with the mold filling approach; step 660—determining the total area of bifilms created; step 670—determining the total area of flow marks created; and step 680—determining the total area of cold shuts created.

Figure 1:
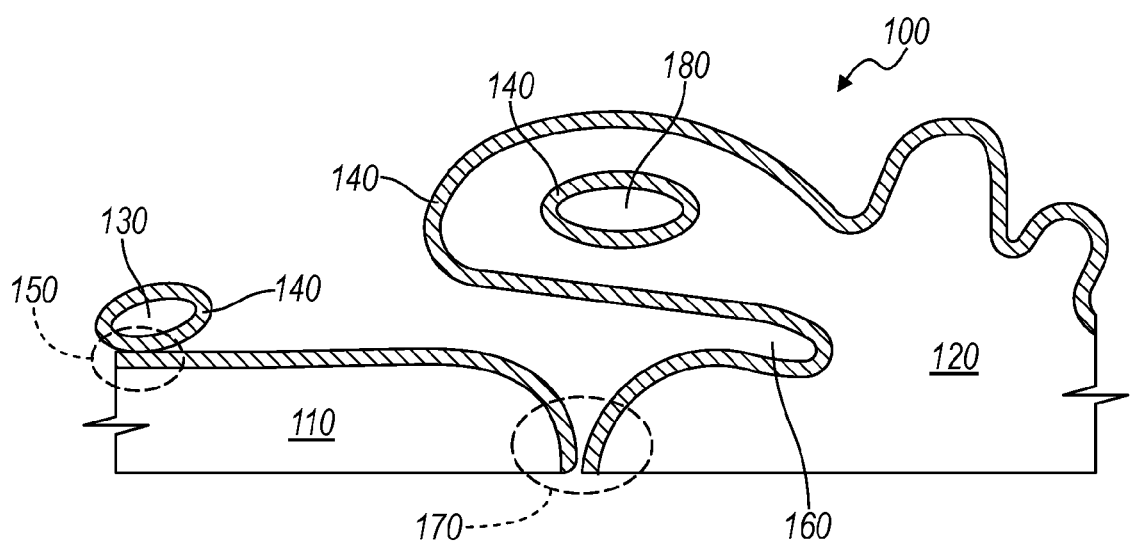
FIG. 1 shows the formation of a bifilm.

Referring initially to FIG. 1, multiple forms of defects in an aluminum alloy are shown. Upon heating into liquid form 100, various streams of aluminum (for example, first stream 110 and second stream 120, as well as droplets 130) interact in varied ways. When processed in an oxygen-containing environment, oxide films 140 may form on the outer surface of the liquid aluminum, including the first stream 110, second stream 120 and droplets 130. A bifilm 170 forms when the two oxide films 140 from respective first stream 110 and second stream 120 meet. Bifilms also form when turbulence-induced droplets land on the metal stream, as shown at 150. While bifilms 150, 170 are an inherent part of almost every casting process, they are generally not detrimental to casting mechanical properties unless the oxide film 140 is entrained in the bulk of the alloy, as shown at location 160 due to the folding action when two separate streams, first stream 110 and second stream 120, meet at large angles (typically more than 135 degrees, where the splashing action of one stream collapses onto another stream to form a cavity therebetween). Such a formation can have significant impacts on overall material integrity and subsequent casting scrap rates. Likewise, entrained gas 180 may form from the pouring action of liquid metal creating additional entrained oxides.

Flow marks and cold shuts are other types of bifilms that may additionally be formed. In simulation, the area of contact is stored for each particle, allowing the total potential bifilm area to be calculated by summation over all such particle surface areas. Flow marks (not shown) are tracked as bifilms which are created at temperatures below the liquidus. Cold shuts (which are one form of bifilm 170) form when two streams of liquid metal are too cold to bond when they meet such that the oxide surface on the outside of both metal streams prevents the streams from fusing together; more particularly, they are tracked as bifilms which are created at temperature below the median temperature of the freezing range (i.e., (liquidus+solidus)/2). Cold shuts are potentially detrimental in that they act like cracks in the part and can be quite large. As with turbulence induced bifilms, the total area of flow marks and cold shuts can be calculated by summation over all particle areas and provides an index of casting quality. Furthermore, the total area of entrained or surface oxide films can be calculated by tracking the free surface area change during mold filling. The model of the present invention may be used to indicate where the cold shut is likely to form, estimate how big it is and how much impact it would have on the part performance. This analysis allows design changes and revisions to eliminate any predicted formation of cold shuts. For example, geometry and process optimization steps may be used to reduce or eliminate cold shuts based on the information gained from the model in the present invention. Specific examples may include changing the filling path or the filling rate to avoid converging streams. Likewise, changing the filling path so the metal doesn't lose as much heat before it meets the other stream could be used to eliminate the cold shut defect.

Yet another macroscale-sized defect that can be considered is entrained gas 180. When liquid metal is poured or forced into a mold, it is possible to trap large gas bubbles therein. If gating components aren't properly shaped, significant amounts of gas may be aspirated into the mold. In some casting approaches (for example, high pressure die casting and squeeze casting processes), the metal fills the mold faster than the gas can be evacuated from the mold cavity, causing metal to surround the trapped gas. The gases inside the mold/die may result from die coating, die lubricant or mold binders.

In an embodiment of the method of simulating aluminum oxides defects in aluminum castings, a scalar variable approach is utilized to track the aluminum oxide formation and distribution. In numerical modeling, one approach is to introduce scalar variables at the metal front to localize the creation of surface oxides. The computational fluid dynamics (CFD) equations solved for such an approach are the transient 3D Navier Stokes equations (4), combined with the Volume of Fluid (VOF) equations (5) for the free surface and the continuity equation (6).

$$\frac{\delta \rho u_x}{\delta t} = -\left[\frac{\delta P}{\delta x}\right] - \left(\frac{\delta \rho u_x u_x}{\delta x} + \frac{\delta \rho u_y u_x}{\delta y} + \frac{\delta \rho u_z u_x}{\delta z}\right) - \quad (4)$$

$$\left(\frac{\delta \tau_{xx}}{\delta x} + \frac{\delta \tau_{xy}}{\delta y} + \frac{\delta \tau_{xz}}{\delta z}\right) + \rho g_x$$

$$\frac{\delta \rho u_y}{\delta t} = -\left[\frac{\delta P}{\delta y}\right] - \left(\frac{\delta \rho u_x u_y}{\delta x} + \frac{\delta \rho u_y u_y}{\delta y} + \frac{\delta \rho u_z u_y}{\delta z}\right) -$$

$$\left(\frac{\delta \tau_{yx}}{\delta x} + \frac{\delta \tau_{yy}}{\delta y} + \frac{\delta \tau_{yz}}{\delta z}\right) + \rho g_y$$

$$\frac{\delta \rho u_z}{\delta t} = \quad (5)$$

$$-\left[\frac{\delta P}{\delta z}\right] - \left(\frac{\delta \rho u_x u_z}{\delta x} + \frac{\delta \rho u_y u_z}{\delta y} + \frac{\delta \rho u_z u_z}{\delta z}\right) - \left(\frac{\delta \tau_{zx}}{\delta x} + \frac{\delta \tau_{zy}}{\delta y} + \frac{\delta \tau_{zz}}{\delta z}\right) + \rho g_z$$

$$\frac{\delta \rho F}{\delta t} = -\left[\frac{\delta}{\delta x}(u_x \rho F) + \frac{\delta}{\delta y}(u_y \rho F) + \frac{\delta}{\delta z}(u_z \rho F)\right] \quad (6)$$

$$\frac{\delta \rho}{\delta t} = -\left[\frac{\delta}{\delta x}(\rho u_x) + \frac{\delta}{\delta y}(\rho u_y) + \frac{\delta}{\delta z}(\rho u_z)\right]$$

Where $u_x$, $u_y$, and $u_z$ is the velocity in x, y, and z direction (m/s), respectively; P is pressure (Pa); $\rho$ is the aluminum density (g/cm^3); t is time (s); $\delta_x$, $\delta_y$, and $\delta_z$ is small increment in x, y, z direction (mm), respectively; F is the force (N); $\tau$ is shear stress (Pa); and g is gravity (m/s^2).

The transient 3D Navier Stokes equation (4) is utilized in an embodiment of the method of simulating aluminum oxides defects in aluminum castings to determine velocity of the aluminum melt at each respective location.

The Volume of Fluid equation (5) is utilized in an embodiment of the method of simulating aluminum oxides defects in aluminum castings to track the free surface area of the melted aluminum.

The continuity equation (6) is utilized in an embodiment of the method of simulating aluminum oxides defects in aluminum castings ensures mass conservation.

In the scalar variable method a convective-diffusive transport equation (7) may further be utilized. The convective-diffusive transport equation accounts for random motion of the entrained or surface oxide films with diffusivity and velocity bias.

$$\frac{\delta \rho C}{\delta t} = -\nabla \cdot \rho u C + \nabla \cdot \left(\rho \eta \left(D + \frac{\mu_t}{\sigma_C}\right) \nabla C\right) \quad (7)$$

Where c is the variable of interest (i.e. oxide film concentration for mass transfer, mm^2/mm^3). D is the mass diffusivity for particle motion (mm^2/s); u is the velocity (mm/s); $\nabla$ represents gradient or divergence; $\mu_t$ is turbulent viscosity (cm^2s^-1); $\sigma_c$ is the turbulent Schmidt number (dimensionless); and $\eta$ is dimensional normal distance (mm).

In an embodiment of the method of simulating aluminum oxides defects in aluminum castings a scalar variable method and a discrete particle method are coupled together to simulate the aluminum oxide defects in aluminum castings. The discrete particle method describes the oxides as discrete particles. The discrete particle method is introduced via a modified Basset-Boussinesq-Oseen equation (8).

$$V_P \rho_P \frac{\partial u_P}{\partial t} = V_P(-\nabla P + \rho g) - \frac{V_P \rho \Delta_A}{2}\left[\frac{\partial u_P}{\partial t} - \frac{\partial u}{\partial t} - u_P \cdot \nabla u\right] - \quad (8)$$

-continued $$V_P g(\rho - \rho_P) + \frac{\pi r_P^2}{2}\rho C_d(u_P - u)|u_P - u| -$$

$$6 r_P^2 \sqrt{\pi \rho \mu} \int_0^t \left[\frac{\partial u_P}{\partial t} - \frac{\partial u}{\partial t} - u_P \cdot \nabla u\right] \frac{dt}{\sqrt{t-s}}$$

Where Vp is the particle volume (mm^3); $\rho$ and $\rho_p$ are liquid aluminum and particle density, respectively (g/cm^3); u and $u_p$ are fluid and particle velocity, respectively (m/s); P is pressure (Pa); g is gravitational acceleration vector (m/s^2;. $r_P$ is particle radius (mm); $C_d$ is drag coefficient (dimensionless); t is time (s); $\mu$ is dynamic viscosity (cm^2s^-1); and s is dimensional time (s).

The transient 3D Navier Stokes equations (4), the Volume of Fluid (VOF) equations (5) and the continuity equation (6) are solved in combination with the modified Basset-Boussinesq-Oseen equation (8) to model the individual discrete oxide particles.

The scalar variable approach is easy to program for computational fluid dynamics analysis. However, the discrete particle method offers the advantage of directly modeling motion between oxides and the liquid aluminum metal. In the discrete particle method, the surface oxide films are tracked and associated with individual particles. The modified Basset-Boussinesq-Oseen equation (8) accounts for the multiple different forces acting upon each discrete oxide particle. The modified Basset-Boussinesq-Oseen equation (8) addresses and takes into account buoyancy force of entrained oxide particles in liquid aluminum, drag force of entrained oxide particles moving through liquid aluminum, Basset force, and added mass from the acceleration or deceleration of entrained aluminum oxide particles through liquid aluminum. In an embodiment, the drag force of entrained oxide particles moving through liquid aluminum is accounted for and the drag force, more particularly, considers the aluminum oxide particle shape.

In an embodiment of a method of simulating aluminum oxides defects in aluminum castings, oxide films are created as part of the simulation at all free surface locations that have not yet had oxide film particles on them. The free surface area of each particle of aluminum is stored. Through tracking of the total free surface area and the change during mold filling, the total area of entrained or surface oxides can be calculated.

In an embodiment of a method of simulating aluminum oxides defects in aluminum casting, the total area of bifilms created is determined. The total area of bifilms are calculated by storing the area of contact between fluid fronts meeting at angles of more than 135 degrees for each of the plurality of particles and summing over all particle areas.

In an embodiment of a method of simulating aluminum oxides defects in aluminum casting, the total area of flow marks created is determined. The total area of flow marks are calculated by storing the area of bifilms created at temperatures below liquidus.

In an embodiment of a method of simulating aluminum oxides defects in aluminum casting, the total area of cold shuts created is determined. The total area of cold shuts is calculated by storing the area of bifilms created at temperatures below the median temperature of the freezing range. Once again, the medium temperature range of the freezing range is (liquidus+solidus)/2).

The simulation of aluminum oxides defects in aluminum castings may also in an embodiment be undertaken in combination with a computer 310. The algorithm disclosed as Equations 4-8 can be performed, run or otherwise conducted on a digital computer in order to produce the resulting data representation of aluminum oxides defects in aluminum castings. In a preferred form, the digital computer preferably includes one or more of an input, an output, a processing unit (often referred to as a central processing unit (CPU)) and memory that can temporarily or permanently store a code, program or algorithm in the computer's memory such that the instructions contained in the code, program or algorithm are operated upon by the processing unit based on input data such that output data generated by the code and the processing unit can be conveyed to another program or a user via output. In one form, a data-containing portion of the memory (also called working memory) is referred to as random access memory (RAM), while an instruction-containing portion of the memory (also called permanent memory is referred to as read only memory (ROM). A data bus or related set of wires and associated circuitry forms a suitable data communication path that can interconnect the input, output, CPU and memory, as well as any peripheral equipment in such a way as to permit the system to operate as an integrated whole. Such a computer system is referred to as having a von Neumann architecture (also referred to as a general purpose or stored-program computer). Likewise, a particularly-adapted computer or computer-related data processing device that employs the salient features of a von Neumann architecture in order to perform at least some of the data acquisition, manipulation or related computational functions, is deemed to be within the scope of the present invention. It will be appreciated by those skilled in the art that computer-executable instructions that embody the calculations discussed above pertaining to measuring and calculating oxide formation and movement can be made to achieve the objectives set forth in the present invention.

Figure 2:
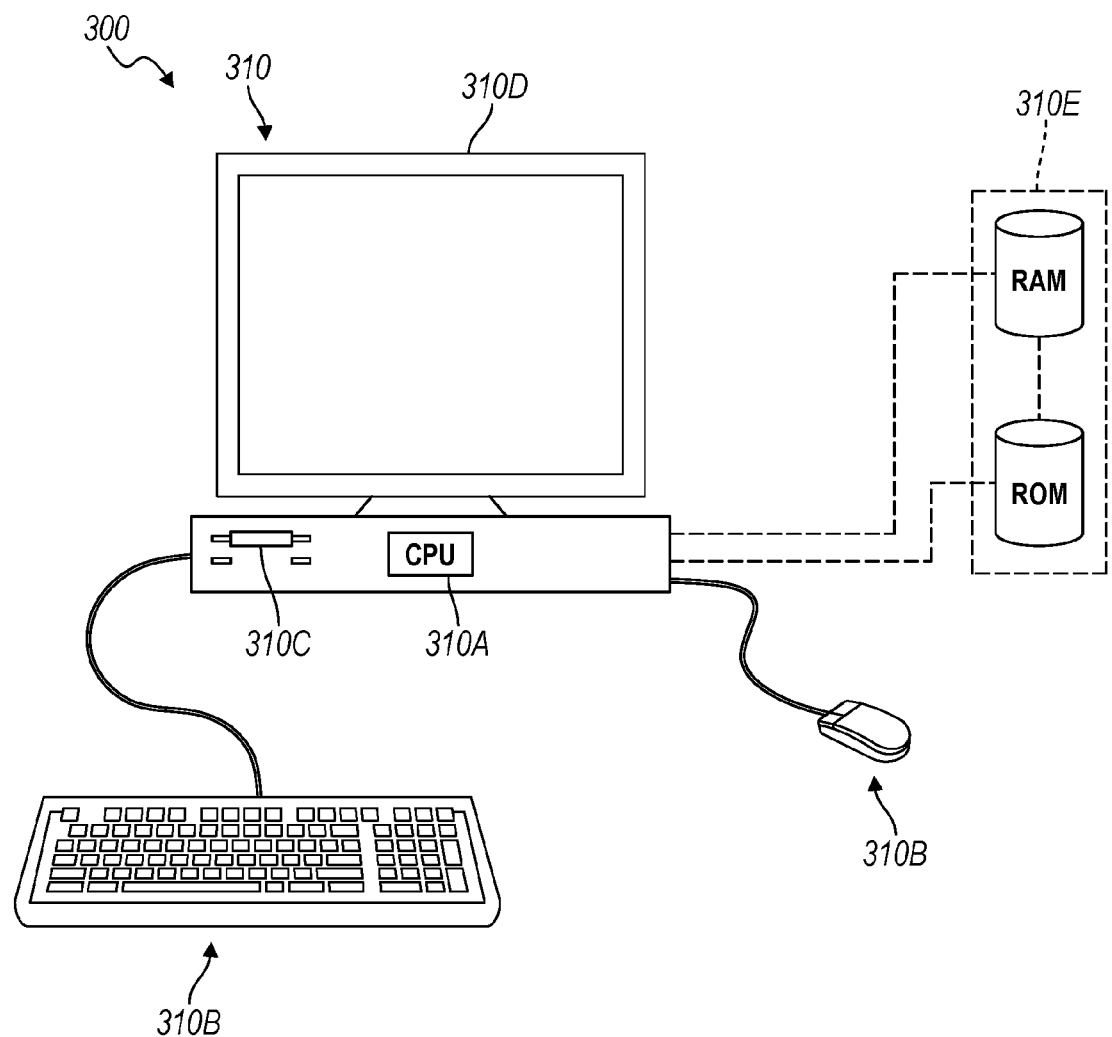
FIG. 2 shows a computational system and method for simulating aluminum oxide biofilms.

Referring to FIG. 2, in an embodiment, a system 300 includes a computer 310 or related data processing equipment that includes a processing unit 310A (which may be in the form of one or more microprocessors or related processing means), one or more mechanisms for information input (including a keyboard, mouse or other device, such as a voice-recognition receiver (not shown)), as well as a one or more loaders 310C (which may be in the form of magnetic or optical memory or related storage in the form of CDs, DVDs, USB port or the like), one or more display screens or related information output 310D, a memory 310E and computer-readable program code means to process at least a portion of the received information relating to the aluminum alloy. As will be appreciated by those skilled in the art, memory 310E may be in the form of random-access memory (RAM, also called mass memory, which can be used for the temporary storage of data) and instruction-storing memory in the form of read-only memory (ROM). In addition to other forms of input such as through an internet or related connection to an outside source of data, the loaders 310C may serve as a way to load data or program instructions from one computer-usable medium (such as flash drives or the aforementioned CDs, DVDs or related media) to another (such as memory 310E). As will be appreciated by those skilled in the art, the computer may exist as an autonomous (i.e., stand-alone) unit, or may be the part of a larger network such as those encountered in cloud computing, where various computation, software, data access and storage services may reside in disparate physical locations. Such a dissociation of the computational resources does not detract from such a system being categorized as a computer.

In a particular form, the computer-readable program code that contains the algorithms and formulae mentioned above (such as Equations 4-8) can be loaded into ROM that is part of the memory 310E. Such computer-readable program code may also be formed as part of an article of manufacture such that the instructions contained in the code are situated on a magnetically-readable or optically-readable disk or other related non-transitory, machine-readable medium, such as flash memory device, CDs, DVDs, EEPROMs, floppy disks or other such medium capable of storing machine-executable instructions and data structures. Such a medium is capable of being accessed by computer 310 or other electronic device having processing unit 310A used for interpreting instructions from the computer-readable program code. As will be understood by those skilled in the computer art, a computer 310 that forms a part of the simulating system for oxide formation in aluminum oxides 300 may additionally include additional chipsets, as well as a bus and related wiring for conveying data and related information between processing unit 310A and other devices (such as the aforementioned input, output and memory devices). Upon having the program code means loaded into ROM, the computer 310 of the system 300 becomes a specific-purpose machine configured to determine an optimal component casting process in a manner as described herein. In another aspect, the system 300 may be just the instruction code (including that of the various program modules), while in still another aspect, the system may include both the instruction code and a computer-readable medium such as mentioned above.

It will also be appreciated by those skilled in the art that there are other ways to receive data and related information besides a manual input approach depicted in input 310B (especially in situations where large amounts of data are being input), and that any conventional means for providing such data in order to allow processing unit 310A to operate on it is within the scope of the present invention. As such, input 310 may also be in the form of high-throughput data line (including the internet connection mentioned above) in order to accept large amounts of code, input data or other information into the memory 310E. The information output 310D is configured to convey information relating to the desired casting approach to a user (when, for example, the information output is in the form of a screen) or to another program or model. It will likewise be appreciated by those skilled in the art that the features associated with the input 310B and output 310D may be combined into a single functional unit such as a graphical user interface (GUI).

Figure 3:
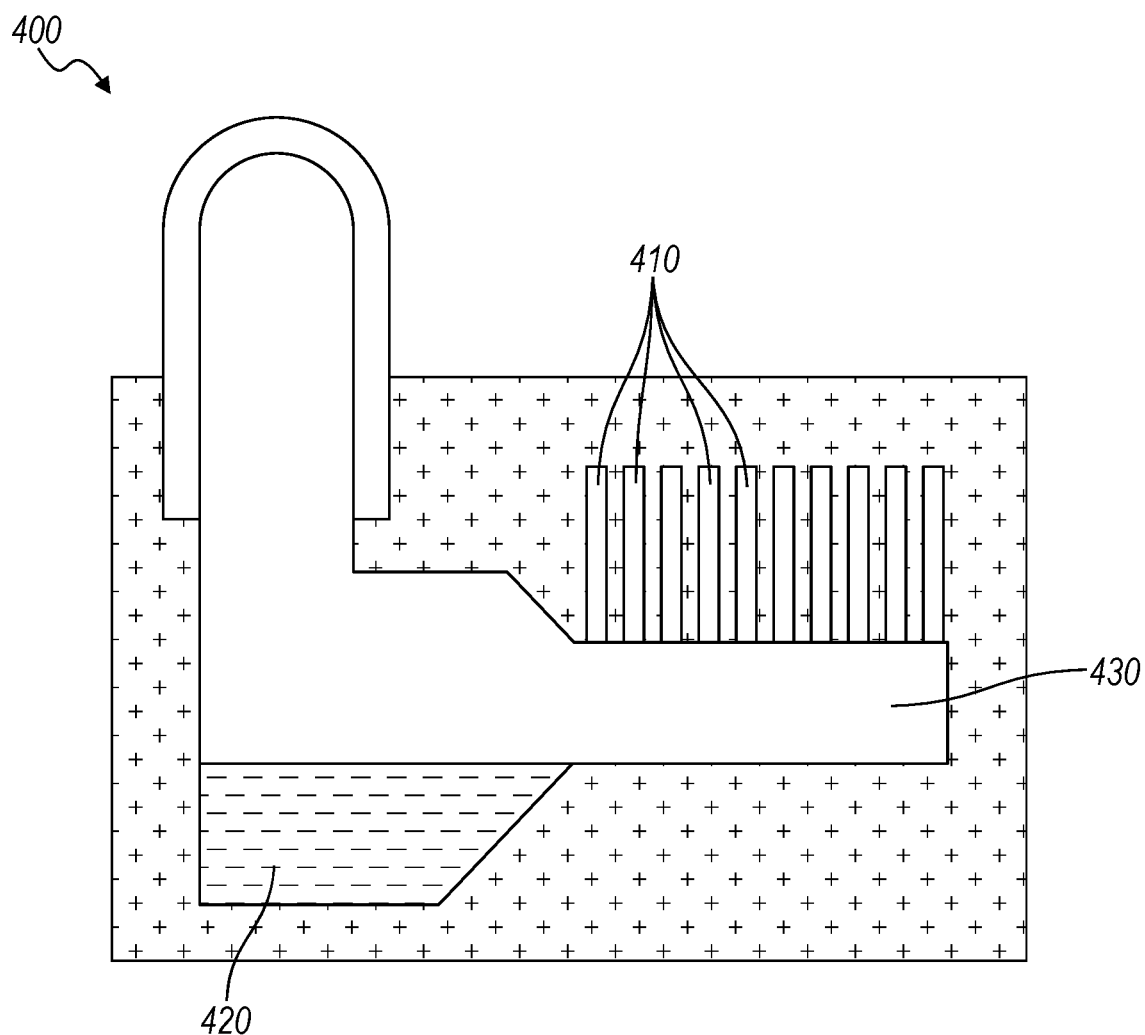
FIG. 3 shows a tilt pour casting apparatus.

Validity of the method of simulating aluminum oxides defects in aluminum castings was checked through comparison of simulation model data and physical experiments. Referring to FIG. 3, a tilt pour casting analysis was undertaken. A tilt pour casting apparatus 400 was operated to cast a set of cast bars formed in tensile bar molds 410. The tilt pour casting consisted of preparation of the set of cast bars which were subsequently used for tensile strength and elongation measurements. The tilt pour casting procedure consists of tilting the tilt pour casting apparatus 400 such that liquid aluminum 420 flows into the feed channel 430 and into the tensile bar molds 410 to form the set of cast bars.

The rate of rotation of the tilting is varied to create differing behavior of the liquid aluminum 420 as it flows into the feed channel 430. Testing was specifically undertaken at tilt speeds of 7, 14, 28, and 43 degrees per second, starting from a horizontal position. Additional testing was undertaken at a tilt speed of 7 degrees per second, staring from an initial position of −20 degrees of inclination. Starting from −20 degrees of inclination means the tilt pour casting apparatus 400 passes through the horizontal position after approximately 2.9 seconds with a tilt speed of 7 degrees per second.

During the tilting of the tilt pour casting apparatus 400 the free surface area of the liquid aluminum 420 was calculated as a function of time. Additionally, the algorithm creates oxide particles at the surface of the liquid aluminum 420 and folded-in surface oxides at locations where the liquid aluminum was locally contracted. The oxides at the surface were forced to conform to local free surface positions. However, the motion of the folded-in or entrained oxides was tracked using the disclosed discrete particle model.

During the tilting of the tilt pour casting apparatus 400 a large quantity of oxides are entrained when the free surface folds over with the formation of a hydraulic bore at the end of the casting. As the liquid aluminum 420 abruptly hits the end of the feed channel 430 the liquid aluminum folds over on itself creating a multitude of entrained oxides. These entrained oxides are dispersed quickly and are relatively uniformly distributed throughout the tensile bar molds 410 and thus the set of cast bars.

It is believed that dispersed oxides cause a reduction in Weibull modulus of cast bars (See J. Campbell, Castings, $2^{nd}$ ed., Oxford: Butterworth-Heinemann, 2003.). Thus, a correlation between the prevalence of dispersed entrained oxides and the Weibull modulus in a cast bar would be expected. A quantitative measurement of the total area of oxide film entrained into the casting was calculated for each rotational speed of the tilt pour casting apparatus 400. The correlation between the predicted oxides and the Weibull modulus illustrates the validity of the model.

The calculated entrained oxide surface area and the experimentally measured Weibull modulus for the multiple rotational speeds of the tilt pour casting apparatus 200 are provided below.

| Rotation Speed | Entrained Oxide Surface Area (cm²) | Weibull Modulus Tensile Strength | Ductility |
|---|---|---|---|
| 7 deg/sec | 55.07 | 19.5 | 2.2 |
| 14 deg/sec | 55.41 | 16.0 | 3.9 |
| 28 deg/sec | 63.02 | 13.0 | 2.4 |
| 43 deg/sec | 80.11 | 17.0 | 3.8 |
| 7 deg/sec; 20 deg back | 14.71 | 35.5 | 7.8 |

In a second example of experimental validation of an embodiment of a method of simulating aluminum oxides defects in aluminum casting, analysis of a low pressure casting was completed. A second example of surface oxide modeling comprised plate castings 500 made using a low pressure process. The casting was made with 319 aluminum alloy. Three plate castings 500 were made simultaneously with a 3-on runner system. An initial 67 seconds was necessary to fill the sprue and runners and an additional 3.6 to 4.6 seconds to fill each of the three plates.

Predicted fill times in the simulation results were in general agreement with experimental measurements, at approximately 4.5 seconds. Additionally, the central plate casting 500 filled more slowly than the outer two plate castings 500 during simulation, which agrees with experimental data. The cause of the difference in filling speed was a difference in runner width between the runners; the center casting runner was 10% narrower than those leading to the two side plate castings 500.

Quantitative analysis using an embodiment of a method of simulating aluminum oxides defects in aluminum casting was used to predict oxides formation and distribution in the cast plates. Oxides entrained into the liquid metal due to simple undulations of the free surface, and the corresponding expansion and contraction of the free surface was determined. According to the model, most of the oxides were entrained into the liquid metal in the main runners, passed through the ingates, and fairly randomly dispersed in all of the plate castings 500.

Figure 4:
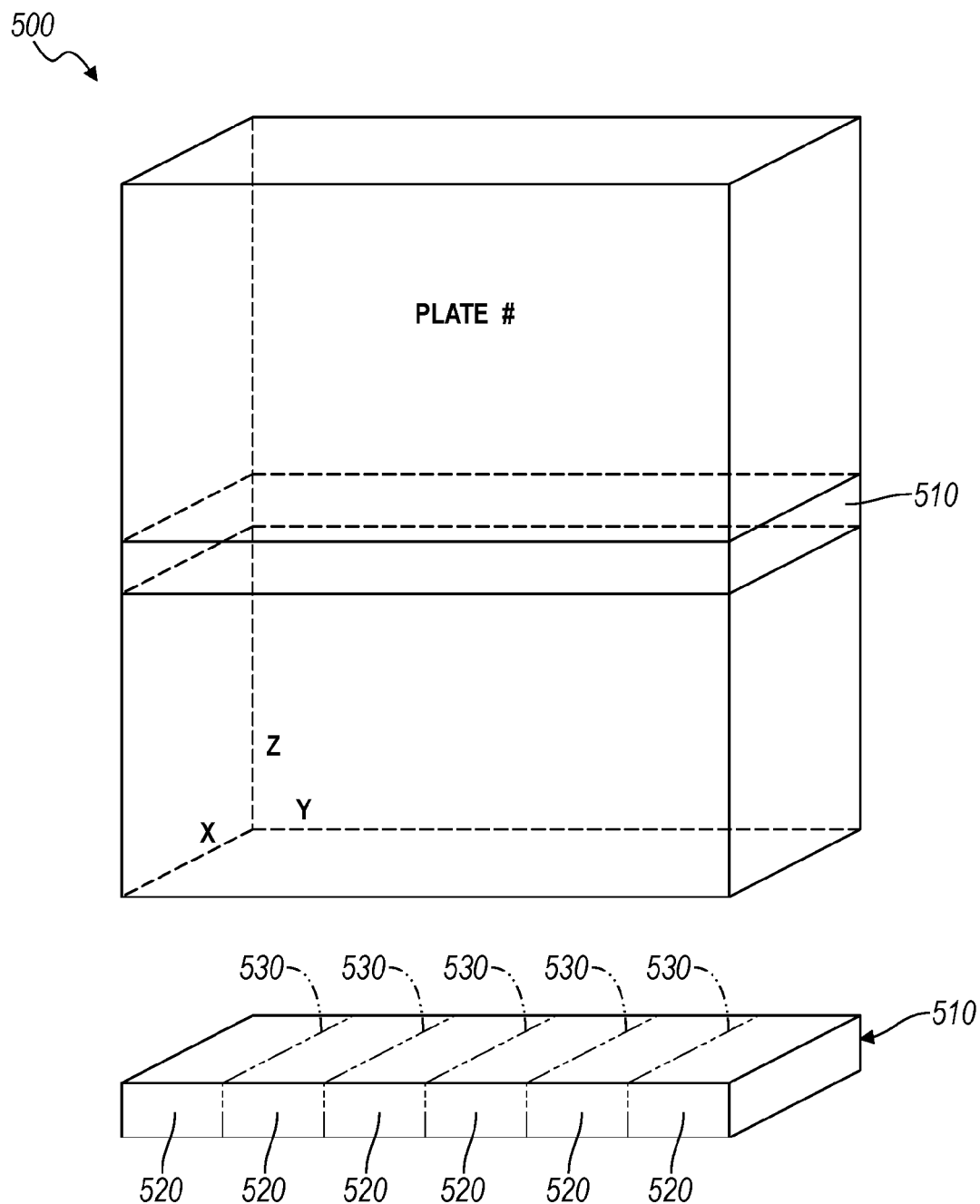
FIG. 4 shows a schematic of cut sections in a plate casting made using a low pressure process.

Experimental measurements of the oxides in the plate castings were conducted. Referring to FIG. 4, the plate castings 500 were sectioned into slices 510. Then each slice 510 was fractured into 6 sectioned pieces 320. The fracturing into 6 sectioned pieces 520 provides 5 pairs of fracture surfaces 530 for examination under both optical and electron microscopes. The oxides on the fracture surfaces 530 were measured to obtain a numerical value for oxide presence in each slice 510.

Direct comparison of the experimentally obtained oxide distribution and the numerical model results is difficult as the experimental data are on a 2-dimensional fracture surface 530 while the numerical model predications are 3-dimensional. However, an estimate can be made by comparing the total surface area of oxides measured on each slice 510 with a total surface area predicted to occur in a thin volume of material at each slice location. The thin slice may for example be 2 mm thick. The experimental data and the predicted model data are then both normalized by their respective section areas. Although the comparison will vary depending on the 3-d slice thickness, the agreement between experimental and numerical predictions is reasonable.

The comparison of experimental oxide area and numerically predicted oxide area for each slice 310 is provided below.

| | Plate Casting 500 #1 | | Plate Casting 500 #2 | |
|---|---|---|---|---|
| | Experimental (area %) | Numerical (area %) | Experimental (area %) | Numerical (area %) |
| Slice #1 | 0.16737 | 0 | 0.587664 | 0 |
| Slice #2 | 0.04847 | 0.015528 | 0.171129 | 0 |
| Slice #3 | 0.01076 | 0.0141579 | 0.367017 | 0.067304654 |
| Slice #4 | 0.14392 | 0 | 0.009974 | 0.021122236 |
| Slice #5 | 0.17200 | 0.0904752 | 0.108399 | 0.03136189 |
| Slice #6 | 0.07699 | 0.2857618 | 0.208749 | 0.034045213 |
| Slice #7 | 0.02100 | 0.1495055 | 0.956955 | 0.121348268 |
| Slice #8 | 0.02931 | 0.0849407 | 0.192826 | 0.177654307 |
| Slice #9 | 0.02301 | 0.0905781 | 0.036395 | 0.078818913 |
| Slice #10 | 0.10359 | 0.1168197 | 0.090026 | 0.098823974 |
| Slice #11 | 0.06290 | 0.114474 | 0.064042 | 0.133405724 |
| Slice #12 | 0.18355 | 0.1801676 | 0.012546 | 0.09041363 |
| Slice #13 | 3.15643 | 0.198393 | 1.904812 | 0.036072929 |
| Slice #14 | 0.02975 | 0.056675 | 0.171041 | 0.175137701 |
| Slice #15 | 0.01820 | 0.103092 | 0.693263 | 0.35388985 |
| Slice #16 | 1.33981 | 0.0705863 | 0.125022 | 0.102227055 |
| Slice #17 | 0.05827 | 0.023553 | 0.051881 | 0.145591953 |
| Slice #18 | 0.29361 | 0.0250361 | 0.088189 | 0.060223063 |
| Slice #19 | 0.07874 | 0.1550779 | 0 | 0.130970366 |
| Slice #20 | 0.03911 | 0.0174871 | 0.113561 | 0 |
| Slice #21 | 0.06203 | 0.0395794 | 0.221697 | 0.048243583 |
| Slice #22 | 0.37305 | 0.1137188 | 3.961592 | 0.013249083 |

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. In the present context, the term "substantially" may also be utilized herein to represent the degree by which a quantitative representation may vary from a stated reference without resulting in a change in the basic function of the subject matter at issue. As such, it is utilized to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of simulating aluminum oxides defects in aluminum castings comprising:
   providing a casting mold and a mold filling approach for casting an aluminum melt;
   determining the free surface area for a plurality of particles of aluminum in the aluminum melt;
   storing the free surface area for each particle of aluminum;
   tracking the free surface area change during filling of the casting mold;
   calculating the total area of entrained or surface oxide films based on the free surface area change during filling of the casting mold in accordance with the mold filling approach;
   determining the total area of bifilms created, wherein the total area of bifilms are calculated by storing the area of contact between fluid fronts meeting at angles of more than 135 degrees for each of the plurality of particles and summing over all particle areas;
   determining the total area of cold shuts created, wherein the total area of cold shuts are calculated by storing the area of bifilms created at temperatures below the median temperature of a freezing range;
   determining a velocity of the aluminum melt at multiple locations; and
   optimizing the casting mold and mold filling approach to minimize the aluminum oxide defects based on one of the determined free surface area for a plurality of particles of aluminum in the aluminum melt, and determined total area of bifilms created, determined total area of cold shuts created, and determined velocity of the aluminum melt at multiple locations;
   wherein the velocity of the aluminum melt is determined using the algorithm $$\frac{\delta \rho u_x}{\delta t} = -\left[\frac{\delta P}{\delta x}\right] - \left(\frac{\delta \rho u_x u_x}{\delta x} + \frac{\delta \rho u_y u_x}{\delta y} + \frac{\delta \rho u_z u_x}{\delta z}\right) - \left(\frac{\delta \tau_{xx}}{\delta x} + \frac{\delta \tau_{xy}}{\delta y} + \frac{\delta \tau_{xz}}{\delta z}\right) + \rho g_x$$

$$\frac{\delta \rho u_y}{\delta t} = -\left[\frac{\delta P}{\delta y}\right] - \left(\frac{\delta \rho u_x u_y}{\delta x} + \frac{\delta \rho u_y u_y}{\delta y} + \frac{\delta \rho u_z u_y}{\delta z}\right) - \left(\frac{\delta \tau_{yx}}{\delta x} + \frac{\delta \tau_{yy}}{\delta y} + \frac{\delta \tau_{yz}}{\delta z}\right) + \rho g_y$$

$$\frac{\delta \rho u_z}{\delta t} = -\left[\frac{\delta P}{\delta z}\right] - \left(\frac{\delta \rho u_x u_z}{\delta x} + \frac{\delta \rho u_y u_z}{\delta y} + \frac{\delta \rho u_z u_z}{\delta z}\right) - \left(\frac{\delta \tau_{zx}}{\delta x} + \frac{\delta \tau_{zy}}{\delta y} + \frac{\delta \tau_{zz}}{\delta z}\right) + \rho g_z$$

wherein $u_x$, $u_y$, and $u_z$ is the velocity in x, y, and z direction (m/s), respectively; P is pressure (Pa); $\rho$ is the aluminum density (g/cm^3); t is time (s); $\delta_x$, $\delta_y$, and $\delta_z$ is small increment in x, y, z direction (mm), respectively; $\tau$ is shear stress (Pa); and g is gravity (m/s^2).

2. The method of claim 1, wherein the free surface area is tracked using the algorithm $$\frac{\delta \rho F}{\delta t} = -\left[\frac{\delta}{\delta x}(u_x \rho F) + \frac{\delta}{\delta y}(u_y \rho F) + \frac{\delta}{\delta z}(u_z \rho F)\right]$$

wherein $u_x$, $u_y$, and $u_z$ is the velocity in x, y, and z direction (m/s), respectively; $\rho$ is the aluminum density (g/cm^3); t is time (s); $\delta_x$, $\delta_y$, and $\delta_z$ is small increment in x, y, z direction (mm), respectively; and F is the force (N).

3. A method of simulating aluminum oxides defects in aluminum castings comprising:
   providing a casting mold and a mold filling approach for casting an aluminum melt;
   determining the free surface area for a plurality of particles of aluminum in the aluminum melt;
   storing the free surface area for each particle of aluminum;
   tracking the free surface area change during filling of the casting mold; and
   calculating the total area of entrained or surface oxide films based on the free surface area change during filling of the casting mold in accordance with the mold filling approach;
   determining a velocity of the aluminum melt at multiple locations; and
   optimizing the casting mold and mold filling approach to minimize the aluminum oxide defects based on one of the determined free surface area for a plurality of particles of aluminum in the aluminum melt and determined velocity of the aluminum melt at multiple locations;
   wherein the velocity of the aluminum melt is determined using the algorithm $$\frac{\delta \rho u_x}{\delta t} = -\left[\frac{\delta P}{\delta x}\right] - \left(\frac{\delta \rho u_x u_x}{\delta x} + \frac{\delta \rho u_y u_x}{\delta y} + \frac{\delta \rho u_z u_x}{\delta z}\right) - \left(\frac{\delta \tau_{xx}}{\delta x} + \frac{\delta \tau_{xy}}{\delta y} + \frac{\delta \tau_{xz}}{\delta z}\right) + \rho g_x$$

-continued $$\frac{\delta \rho u_y}{\delta t} = -\left[\frac{\delta P}{\delta y}\right] - \left(\frac{\delta \rho u_x u_y}{\delta x} + \frac{\delta \rho u_y u_y}{\delta y} + \frac{\delta \rho u_z u_y}{\delta z}\right) - \left(\frac{\delta \tau_{yx}}{\delta x} + \frac{\delta \tau_{yy}}{\delta y} + \frac{\delta \tau_{yz}}{\delta z}\right) + \rho g_y$$

$$\frac{\delta \rho u_z}{\delta t} = -\left[\frac{\delta P}{\delta z}\right] - \left(\frac{\delta \rho u_x u_z}{\delta x} + \frac{\delta \rho u_y u_z}{\delta y} + \frac{\delta \rho u_z u_z}{\delta z}\right) - \left(\frac{\delta \tau_{zx}}{\delta x} + \frac{\delta \tau_{zy}}{\delta y} + \frac{\delta \tau_{zz}}{\delta z}\right) + \rho g_z$$

the free surface area is tracked using the algorithm $$\frac{\delta \rho F}{\delta t} = -\left[\frac{\delta}{\delta x}(u_x \rho F) + \frac{\delta}{\delta y}(u_y \rho F) + \frac{\delta}{\delta z}(u_z \rho F)\right]$$

and the mass conservation is ensured using the algorithm $$\frac{\delta \rho}{\delta t} = -\left[\frac{\delta}{\delta x}(\rho u_x) + \frac{\delta}{\delta y}(\rho u_y) + \frac{\delta}{\delta z}(\rho u_z)\right]$$

wherein $u_x$, $u_y$, and $u_z$, is the velocity in x, y, and z direction (m/s), respectively; P is pressure (Pa); $\rho$ is the aluminum density (g/cm^3); t is time (s); $\delta_x, \delta_y, \delta_z$ is small increment in x, y, z direction (mm), respectively; F is the force (N), $\tau$ is shear stress (Pa); and g is gravity (m/s^2).

4. The method of claim 3 wherein the movement of a discrete entrained oxide particle is described by the algorithm $$V_P \rho_P \frac{\partial u_P}{\partial t} =$$

-continued $$V_P(-\nabla P + \rho g) - \frac{V_P \rho \Delta_A}{2}\left[\frac{\partial u_P}{\partial t} - \frac{\partial u}{\partial t} - u_P \cdot \nabla u\right] - V_P g(\rho - \rho_P) +$$

$$\frac{\pi r_P^2}{2}\rho C_d(u_P - u)|u_P - u| - 6r_P^2 \sqrt{\pi \rho \mu}\int_0^t \left[\frac{\partial u_P}{\partial t} - \frac{\partial u}{\partial t} - u_P \cdot \nabla u\right]\frac{dt}{\sqrt{t-s}}$$

wherein Vp is the particle volume (mm^3); $\Delta_A$ is the free surface area change, $\rho$ and $\rho_p$ are liquid aluminum and particle density, respectively (g/cm^3); u and $u_p$ are fluid and particle velocity, respectively (m/s); P is pressure (Pa); g is gravitational acceleration vector (m/s^2); $r_P$ is particle radius (mm); $C_d$ is drag coefficient (dimensionless); t is time (s); $\mu$ is dynamic viscosity (cm^2s^-1); and s is dimensional time (s).

5. The method of claim 4, wherein the method is performed by a computer with the algorithms programmed therein.

6. A method of simulating aluminum oxides defects in aluminum castings comprising:

providing a casting mold and a mold filling approach for casting an aluminum melt;
determining the free surface area for a plurality of particles of aluminum in the aluminum melt;
storing the free surface area for each particle of aluminum;
tracking the free surface area change during filling of the casting mold; and
calculating the total area of entrained or surface oxide films based on the free surface area change during filling of the casting mold in accordance with the mold filling approach;
wherein a scalar variable method and a discrete particle method are coupled together to simulate the aluminum oxide defects in aluminum castings;
determining a velocity of the aluminum melt at multiple locations; and
optimizing the casting mold and mold filling approach to minimize the aluminum oxide defects based on one of the determined free surface area for a plurality of particles of aluminum in the aluminum melt, calculated total area of entrained or surface oxide films, determined velocity of the aluminum melt at multiple locations; and simulated aluminum oxide defects;
wherein:
the velocity of the aluminum melt is determined using the algorithm $$\frac{\delta \rho u_x}{\delta t} = -\left[\frac{\delta P}{\delta x}\right] - \left(\frac{\delta \rho u_x u_x}{\delta x} + \frac{\delta \rho u_y u_x}{\delta y} + \frac{\delta \rho u_z u_x}{\delta z}\right) - \left(\frac{\delta \tau_{xx}}{\delta x} + \frac{\delta \tau_{xy}}{\delta y} + \frac{\delta \tau_{xz}}{\delta z}\right) + \rho g_x$$

$$\frac{\delta \rho u_y}{\delta t} = -\left[\frac{\delta P}{\delta y}\right] - \left(\frac{\delta \rho u_x u_y}{\delta x} + \frac{\delta \rho u_y u_y}{\delta y} + \frac{\delta \rho u_z u_y}{\delta z}\right) - \left(\frac{\delta \tau_{yx}}{\delta x} + \frac{\delta \tau_{yy}}{\delta y} + \frac{\delta \tau_{yz}}{\delta z}\right) + \rho g_y$$

$$\frac{\delta \rho u_z}{\delta t} = -\left[\frac{\delta P}{\delta z}\right] - \left(\frac{\delta \rho u_x u_z}{\delta x} + \frac{\delta \rho u_y u_z}{\delta y} + \frac{\delta \rho u_z u_z}{\delta z}\right) - \left(\frac{\delta \tau_{zx}}{\delta x} + \frac{\delta \tau_{zy}}{\delta y} + \frac{\delta \tau_{zz}}{\delta z}\right) + \rho g_z$$

the free surface area is tracked using the algorithm $$\frac{\delta \rho F}{\delta t} = -\left[\frac{\delta}{\delta x}(u_x \rho F) + \frac{\delta}{\delta y}(u_y \rho F) + \frac{\delta}{\delta z}(u_z \rho F)\right];$$

the mass conservation is ensured using the algorithm $$\frac{\delta \rho}{\delta t} = -\left[\frac{\delta}{\delta x}(\rho u_x) + \frac{\delta}{\delta y}(\rho u_y) + \frac{\delta}{\delta z}(\rho u_z)\right];$$

and
wherein $u_x$, $u_y$, and $u_z$ is the velocity in x, y, and z direction (m/s), respectively; P is pressure (Pa); $\rho$ is the aluminum density (g/cm^3); t is time (s); $\delta_x$, $\delta_y$, and $\delta_z$ is small increment in x, y, z direction (mm), respectively; $g_x$, $g_y$ and $g_z$ is gravity in the x, y, z direction m/s^2), $\tau$ is shear stress (Pa); and F is the force (N); and
the movement of entrained or surface oxide films is described by the algorithm $$\frac{\delta \rho C}{\delta t} = -\nabla \cdot \rho u C + \nabla \cdot \left( \rho \eta \left( D + \frac{\mu_t}{\sigma_C} \right) \nabla C \right).$$

wherein c is the variable of interest (oxide film concentration for mass transfer, mm^2/mm^3); D is the mass diffusivity for particle motion (mm^2/s); u is the velocity (mm/s); $\nabla$ represents gradient or divergence; $\mu_t$ is turbulent viscosity (cm^2s^-1); $\sigma_c$ is the turbulent Schmidt number (dimensionless); and $\eta$ is dimensional normal distance (mm).

\* \* \* \* \*